June 7, 1949. E. LIJOI 2,472,713
ELECTRIC WATER-HEATING SYSTEM
Original Filed Nov. 5, 1936
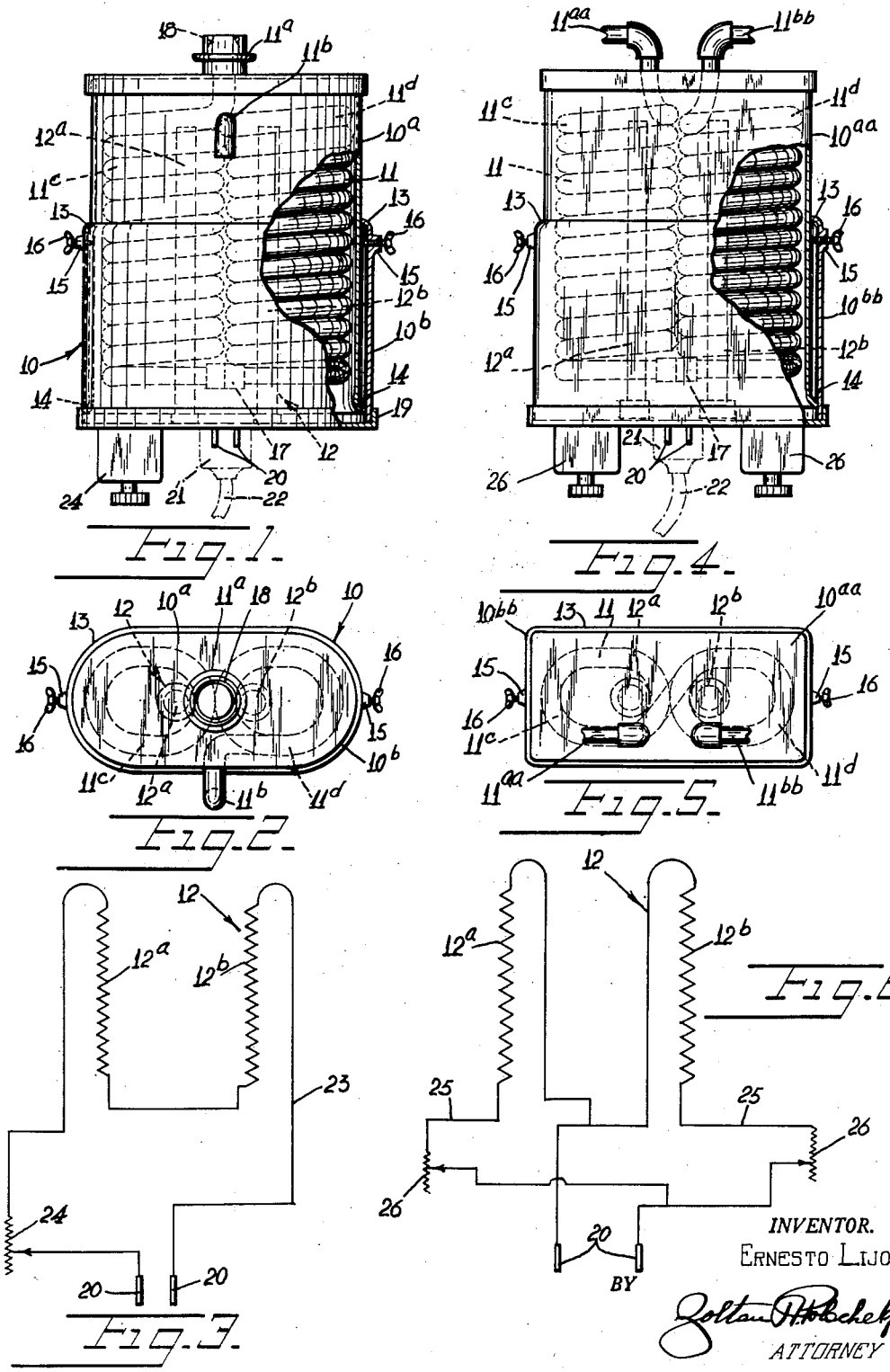
INVENTOR.
ERNESTO LIJOI
BY
ATTORNEY Patented June 7, 1949

2,472,713

UNITED STATES PATENT OFFICE 2,472,713

ELECTRIC WATER-HEATING SYSTEM

Ernesto Lijoi, Brooklyn, N. Y.

Substituted for application Serial No. 109,220, November 5, 1936. This application April 14, 1948, Serial No. 20,962

8 Claims. (Cl. 219—39)

1

This invention relates to new and useful improvements in an electric water-heating system, and is a substitute for my earlier abandoned application Serial No. 109,220, filed November 5, 1936.

The invention has for an object the construction of a device as mentioned which is characterized by a container housing a water coil, and an electric heater within the container arranged to heat the coil.

More specifically, in one form of the invention it is contemplated to construct the water coil with an inlet which may be attached to a faucet.

A still further object of the invention is to arrange the water coil in another form of the invention with an inlet and an outlet which may be connected in series in a water supply, preferably near a faucet or outlet.

Another object of the invention is to construct the container of sections so as to be capable of being manually expanded or contracted and to arrange the water coil on one of these sections, and to arrange the electric heater on the other of these sections. With this arrangement it is possible to change the radiating qualities, or the amount of heat supplied by the electric heater to the coil.

A further object of the invention is to provide rheostats or other controls for the current to widen the degree to which the heat supply may be controlled.

Still another object of this invention proposes forming the coil of separate coiled sections with the provision of a separate electric heating element within each of the coiled sections in a manner to more efficiently heat the water within each section.

It is a further object of the present invention to provide a single rheostat for controlling the operation of the electric heating element or to provide a rheostat for controlling the operation of each electric heating element independently of the other in a manner to permit the operation of each heating element to be independently controlled to meet desired requirements.

Another object of the invention is the construction of a device as mentioned which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

2

In the accompanying drawing forming a material part of this disclosure:

Fig. 1 is a front elevational view of the electric water heater constructed in accordance with the present invention, but with a portion broken away to reveal interior construction.

Fig. 2 is a plan view of Fig. 1.

Fig. 3 is a schematic wiring diagram of the device.

Fig. 4 is a front elevational view similar to Fig. 1, but illustrating a modification of the invention.

Fig. 5 is a plan view of Fig. 4.

Fig. 6 is a schematic wiring diagram of the device shown in Figs. 4 and 5.

The electric water-heating system, according to this invention, comprises a container 10 composed of sections 10$^a$ and 10$^b$ telescopically engaged with each other so that they may be manually moved to expand or contract the container, a water heater coil 11 is supported within the container on one of the sections and has an inlet 11$^a$ and an outlet 11$^b$. An electric heater 12 is supported within the container on the other of said sections.

The section 10$^b$ is the outer of the two and has its free edge 13 bent inwards and adapted to cooperate with the outbent edge 14 of the section 10$^a$ for limiting the expansion of the container. Several bosses 15 are arranged upon the side of the section 10$^b$ and support clamp screws 16 adapted to abut the section 10$^a$ by which the container may be locked in fixed position.

The water coil 11 is arranged in two helical coil sections 11$^c$ and 11$^d$. These sections are connected at their bottom ends by a coupling 17. The top end of the section 11$^c$ connects with the inlet 11$^a$. This inlet preferably has a rubber gasket 18 at its mouth by which it may be forced upon a faucet and maintain its position frictionally. The upper end of the section 11$^d$ of the water coil 11 connects with the discharge 11$^b$.

The electric heater 12 includes a pair of heating elements 12$^a$ and 12$^b$ which extend respectively through the coil sections 11$^c$ and 11$^d$. This heater is mounted upon a base 19 attached to the container section 10$^b$. A pair of terminals 20 project from the base 19 and are adapted to be engaged by a conventional electric plug, indicated by the dot and dash lines 21. This plug is associated with a cable 22, also shown by dot and dash lines, by which it may be conected with a source of electricity. The terminals 20 are connected in a series circuit 23, see Fig. 3, which includes a manually controllable rheostat 24 and the heating elements 12ª and 12ᵇ of the electric heater 12, so that operation of the heater may be manually controlled by adjusting the single rheostat 24.

The device may be easily engaged upon a faucet, and upon switching on of the electricity, hot water may be generated and supplied in a very short period of time. The temperature of this water may be controlled by adjusting the rheostat 24 to control the amount of current passing through the electric heater 12. A further control of the temperature of the water is possible by adjusting the position of the casing section 10ᵇ. This casing section may be lowered so as to partially remove the heater 12 from the proximity of the water coil 11. Furthermore, the surface of the container may thus be increased.

In Figs. 4 to 6 a modification of the invention has been disclosed which is very similar to the previous form except for the fact that the device is adapted to be connected in series in a water supply line, preferably near a faucet or outlet. According to this form of the invention the water coil 11 has an inlet 11ᵃᵃ and outlet 11ᵇᵇ which may be connected directly in a water line by suitable couplings. Furthermore, in this form of the invention the device has a differently shaped container composed of the sections 10ᵃᵃ and 10ᵇᵇ which are square in cross-section.

Also, in this form of the invention, each of the heating elements 12ª and 12ᵇ of the electric heater 12 is mounted in a separate circuit 25, see Fig. 6, for independently controlling the operation of each of the heating elements 12ª and 12ᵇ. Each circuit 25 includes in series the terminals 20, a manually controllable rheostat 26 and either the heating element 12ª or the heating element 12ᵇ. Thus, the rheostats 26 are independently adjustable to control the operation of the respective heating element with which the rheostat is connected in series.

In other respects this form of the invention is similar to that previously described and like reference numerals identify like parts in each of the several views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A water heating device, comprising a container formed of telescopically engaged sections, a water coil supported within said container upon one of said sections and having an inlet and an outlet, and a heater within said container and supported upon the other of said sections and extended into said water coil, said container sections being adjustable relative to one another for controlling the extension of said heater into said coil, said coil being formed of separate sections and said heater having separate heating elements extended into said coil sections, said heater being an electric heater and having its heating elements mounted in a circuit including in series a source of power, a manually controllable rheostat and said heating elements.

2. A water heating device, comprising a container formed of telescopically engaged sections, a water coil supported within said container upon one of said sections and having an inlet and an outlet, and a heater within said container and supported upon the other of said sections and extended into said water coil, said container sections being adjustable relative to one another for controlling the extension of said heater into said coil, said coil being formed of separate sections and said heater having separate heating elements extended into said coil sections, said heater being an electric heater and having its heating elements mounted in separate circuits each of which includes in series a source of power, a manually controllable rheostat and one of said heating elements.

3. A water heating device, comprising a container formed of telescopically engaged sections, a water coil supported within said container upon one of said sections and having an inlet and an outlet, a heater supported within said container upon the other of said sections, said sections being axially adjustable relative to one another for controlling the engagement of said heater in said coil, and abuttable edges formed on said sections to prevent complete disengagement of the sections from each other.

4. An electric water heating device, comprising a container composed of sections so as to be capable of being manually expanded or contracted, a water coil supported within said container upon one of said sections and having an inlet and an outlet, and an electric heater supported within said container upon the other of said sections, said sections being telescopically engaged with each other and having abuttable edges to prevent complete disengagement of the sections from each other.

5. An electric water heating device, comprising a container composed of sections so as to be capable of being manually expanded or contracted, a water coil supported within said container upon one of said sections and having an inlet and an outlet, and an electric heater supported within said container upon the other of said sections, said sections being telescopically engaged with each other and having abuttable edges to prevent complete disengagement of the sections from each other, and means locking said sections in fixed positions.

6. An electric water heating system, comprising a container having an inner section and an outer section telescopically engaging each other so as to be capable of being manually expanded or contracted, a water coil having an inlet and an outlet and being supported within said inner section, and an electric heater supported on said outer section and extending into said water coil, whereby said outer section may be manually separated from or engaged over said inner section to withdraw from or extend said heater into said coil to control the temperature of the water within said coil, said sections having opposed edge portions adapted to abut each other to prevent said sections from entirely disengaging each other.

7. An electric water heating system, comprising a container having an inner section and an outer section telescopically engaging each other so as to be capable of being manually expanded or contracted, a water coil having an inlet and an outlet and being supported within said inner section, and an electric heater supported on said outer section and extending into said water coil, whereby said outer section may be manually separated from or engaged over said inner section to withdraw from or extend said heater into said coil to control the temperature of the water within said coil, said sections having opposed edge portions adapted to abut each other to prevent said sections from entirely disengaging each other, and means for holding said outer section in desired extended positions on said inner section.

8. An electric water heating system, comprising a container having an inner section and an outer section telescopically engaging each other so as to be capable of being manually expanded or contracted, a water coil having an inlet and an outlet and being supported within said inner section, an electric heater supported on said outer section and extending into said water coil, whereby said outer section may be manually separated from or engaged over said inner section to withdraw from or extend said heater into said coil to control the temperature of the water within said coil, bosses on said outer section near the top edge thereof, and clamp screws engaging through said bosses and being adapted to abut the outer face of said inner section to hold said sections in their adjusted positions.

ERNESTO LIJOI.

REFERENCES CITED

The following references are of record in the file of this patent:

UNITED STATES PATENTS

| Number | Name | Date |
|---|---|---|
| 636,091 | Waterman et al. | Oct. 31, 1899 |
| 1,408,634 | Passmore et al. | Mar. 7, 1922 |
| 1,670,032 | Gibbons | May 15, 1928 |
| 1,688,108 | Berger | Oct. 16, 1928 |
| 1,960,910 | Johnson | May 29, 1934 |